UNITED STATES PATENT OFFICE.

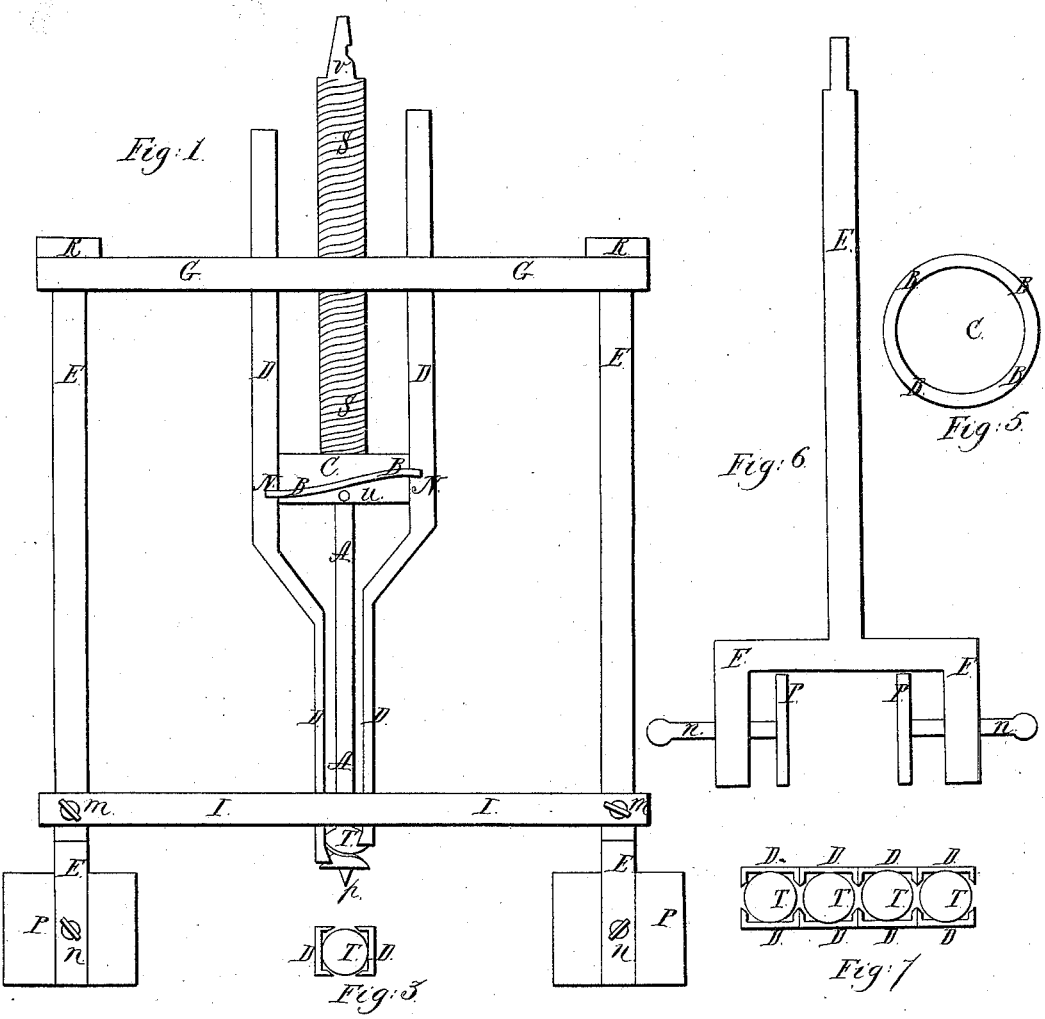
Morrison & Doran,
Mortising Machine.
No 11,430.   Patented Aug. 1, 1854.

WM. H. MORRISON AND M. W. E. DORAN, OF INDIANAPOLIS, INDIANA.

MORTISING-MACHINE.

Specification of Letters Patent No. 11,430, dated August 1, 1854.

*To all whom it may concern:*

Be it known that we, WM. HENRY MORRISON and M. W. E. DORAN, of Indianapolis, in the county of Marion and State of Indiana, have invented new and useful Improvements in Boring and Mortising Machines; and we do hereby declare that the following is a full and exact description thereof, reference being had to the accompanying drawings, and to the letters of reference marked thereon, which are hereby made a part of this specification.

The same letters in all the figures refer to the same parts.

The plan at present submitted shows a boring and mortising machine which may be used by hand by attaching a common brace to it.

A (Figure 1) is the shank, and T the twisted part of the auger.

D, D, are two chisels at the sides of the auger, which partially inclose the lower end of the latter. The shape of the cutting part of these chisels is shown in Figs. 1 and 3. They are grooved on the inner sides, so as to fit as closely to the auger as possible. Both the auger and the chisels work in a frame of the following description: E, E, Figs. 1 and 6, are two bars, divided near their lower ends, as shown in Fig. 6. Through their lower ends, as seen in Figs. 1 and 6, two screws (n, n,) work. To the inner ends of these screws are attached two clamping plates P, P, which turn loosely on the ends of the screws n, n. These are used to clamp the machine firmly on the piece of wood which is to be mortised. Above the points at which the bars E, E, are divided, a bar I connects them, having holes i, i, in its ends, through which the former pass. The bars I, I, and E, E, are clamped together by screws m, m, which pass through the former and work on the sides of the latter. Through the bar I, are also holes d, d, Fig. 4, on which the shanks of the chisels D, D, work, and the hole a, through which the shank of the auger A works. The bars E, E, are also connected at their upper ends by another bar G, the former passing through the latter and being secured by the nuts R, R. Through the bar G are two holes h, h, in which the shanks of the chisels work, and another hole H, in which a screw thread is cut for the screw S. This screw is a continuation of the shank of the auger, the latter entering the former at its lower end, and being there secured by the screw u, so that they will revolve together. To the lower end of the screw S, a cylindrical piece of iron C, is solidly fastened, concentric with it, (Figs. 1 and 5.) Around the piece C is a narrow projecting band B, B, on which the shanks of the chisels D, D, fit by means of the notches N, N, in the latter. The plane in which the projecting band B B lies, not being perpendicular to the axis of the auger, but somewhat inclined from the same, at each revolution of the auger the chisels D, D are alternately raised and lowered.

v is the part designed to fit into a common brace, or instead of this a cog wheel may be placed there, or any other known method used of communicating rotary motion.

A number of such sets of chisels and augers may be combined together, as shown in Fig. 7, so that a mortise of greater or less length may be cut, as may be desired. The motion given to the chisels as described makes them cut better, and this arrangement of the chisels and auger clears out the core of the mortise, the shavings escaping between the chisels and the shaft of the auger.

We are aware that the auger and chisel have before been combined in mortising machines, but not in the manner here described.

What we claim as our invention and desire to secure by Letters Patent, is:

The combination, in boring and mortising machines, of the alternately rising and falling chisels, with the auger, so that both are in operation at the same time, substantially as above set forth, or by any known equivalent mechanical means; also the combination of a number of such sets of chisels and augers as described, for cutting mortises of greater or less length as may be desired.

WM. HENRY MORRISON.
  M. W. E. DORAN.

Witnesses:
 S. H. JAMESON,
 A. D. FRAZEE.